United States Patent
Tiwari et al.

(10) Patent No.: US 11,643,082 B2
(45) Date of Patent: May 9, 2023

(54) SYSTEMS AND METHODS FOR DETERMINING REAL-TIME LANE LEVEL SNOW ACCUMULATION

(71) Applicant: Toyota Motor Engineering & Manufacturing North America, Inc., Plano, TX (US)

(72) Inventors: Prashant Tiwari, Santa Clara, CA (US); Rui Guo, Mountain View, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 275 days.

(21) Appl. No.: 16/985,787

(22) Filed: Aug. 5, 2020

(65) Prior Publication Data
US 2022/0041166 A1    Feb. 10, 2022

(51) Int. Cl.
*B60W 40/06* (2012.01)
*G06N 3/04* (2023.01)
*G06V 20/56* (2022.01)

(52) U.S. Cl.
CPC .............. *B60W 40/06* (2013.01); *G06N 3/04* (2013.01); *G06V 20/56* (2022.01); *B60W 2555/20* (2020.02)

(58) Field of Classification Search
None
See application file for complete search history.

(56) References Cited

U.S. PATENT DOCUMENTS

| | | | |
|---|---|---|---|
| 2019/0294167 A1* | 9/2019 | Kutila | G01C 21/3461 |
| 2021/0063167 A1* | 3/2021 | Groh | B60R 21/0136 |
| 2021/0163021 A1* | 6/2021 | Frazzoli | B60W 50/02 |
| 2021/0383269 A1* | 12/2021 | Zhou | G05D 1/0255 |

FOREIGN PATENT DOCUMENTS

| | | |
|---|---|---|
| CA | 3067177 A1 | 8/2016 |
| DE | 102009050504 A1 | 11/2010 |
| DE | 102018130195 A1 | 6/2019 |
| DE | 102019002598 A1 | 10/2019 |
| JP | 6592051 B2 | 10/2019 |
| WO | 2013180273 A1 | 12/2013 |

* cited by examiner

*Primary Examiner* — Thomas E Worden
(74) *Attorney, Agent, or Firm* — Dinsmore & Shohl LLP

(57) ABSTRACT

A method comprises receiving an image of a road captured by a vehicle driving on the road, receiving a map of the road, the map comprising a road geometry of the road, obtaining an edge map of the road based on the image of the road, inputting the image, the map of the road, and the edge map into a trained regressor neural network, determining an estimated snow depth for each of one or more lanes of the road based on an output of the regressor neural network, and transmitting the estimated snow depth to an edge computing device.

12 Claims, 14 Drawing Sheets

SYSTEMS AND METHODS FOR DETERMINING REAL-TIME LANE LEVEL SNOW ACCUMULATION

TECHNICAL FIELD

The present specification relates to driver assistance systems, and more particularly, to systems and methods for determining real-time lane level snow accumulation.

BACKGROUND

Snow accumulation on roads can be a hazard for vehicles driving on those roads. As such, it may be advantageous for drivers to be aware of accumulated snow on various lanes of roads so that drivers may choose to drive along certain roads or lanes of roads accordingly. However, information about accumulated snow levels is usually only available at a macro-level. For example, traffic and/or weather reports may include snow accumulation levels. However, these reports typically report snow accumulation only for large geographic areas and do not account for variations in snow accumulation across different roads or different lanes on those roads. Accordingly, there is a need for systems and methods for determining real-time lane level snow accumulation.

SUMMARY

In one embodiment, a method includes receiving an image of a road captured by a vehicle driving on the road, receiving a map of the road, the map comprising a road geometry of the road, obtaining an edge map of the road based on the image of the road, inputting the image, the map of the road, and the edge map into a trained regressor neural network, determining an estimated snow depth for each of one or more lanes of the road based on an output of the regressor neural network, and transmitting the estimated snow depth to an edge computing device.

In another embodiment, a vehicle system includes one or more processors, one or more memory modules, one or more vehicle sensors, and machine readable instructions stored in the one or more memory modules. When executed by the one or more processors, the machine readable instructions cause the vehicle system to receive an image of a road that the vehicle is driving on, captured by the one or more vehicle sensors, receive a map of the road, the map comprising a road geometry of the road, obtain an edge map of the road based on the image of the road, input the image, the map of the road, and the edge map into a trained regressor neural network, and determine an estimated snow depth for each of one or more lanes of the road based on an output of the regressor neural network.

In another embodiment, a method includes receiving, from one or more edge computing devices, aggregate snow depths for each of one or more lanes of a plurality of roads, updating a database comprising estimated snow depths for each of the plurality of roads based on the aggregate snow depths for each of the one or more lanes of the plurality roads received from the one or more edge computing devices, and transmitting the snow depths of the one or more lanes of the plurality of roads to at least one of the one or more edge computing devices.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include systems and methods for determining real-time lane level snow accumulation. A vehicle may drive along a road and may capture images of the road using a camera or other vehicles sensors. The vehicle may also have access to a high-definition (HD) map of the road, either locally stored or received from an external server. A vehicle system may input a captured image of a road into a scene segmentation neural network to determine an edge map of the road. The vehicle system may then input the edge map, the captured image of the road, and an HD map of the road into a trained regressor neural network. The regressor neural network may then output an estimated snow depth for each lane of the road.

After the regressor neural network determines predicted snow depth for each lane of the road, the vehicle system may transmit this snow depth data to an edge server. The edge server may receive snow depth data for a plurality of vehicles and may average the snow depths for a particular road determined by a plurality of vehicles to determine an aggregate snow depth for each lane of the road. By averaging snow depths determined by multiple vehicles, the aggregate snow depth may be more accurate than the snow depth determined by any individual vehicle. The edge server may transmit the determined aggregate snow depth information to each of the vehicles within the coverage area of the edge server. Each vehicle that receives this snow depth information from the edge server may display the received snow depth information to a driver of the vehicle. The driver of the vehicle may then make driving decisions (e.g., deciding to drive on a particular road on in a particular lane) based on the snow depth information.

The edge server may also transmit the determined aggregate snow depth data to a cloud server. The cloud server may receive aggregate snow depth data from a plurality of edge servers, with each edge server providing coverage for a different geographic area. Thus, the cloud server may maintain a comprehensive map of lane-level snow accumulation across a wide geographic region. In addition, the cloud server may receive weather forecasts that may include predictions of future snow accumulation. Thus, the cloud server may predict future snow depth levels based on weather forecasts and data received from edge servers. The cloud server may periodically transmit this information to the edge servers, which may relay the information to individual vehicles.

Figure 1:
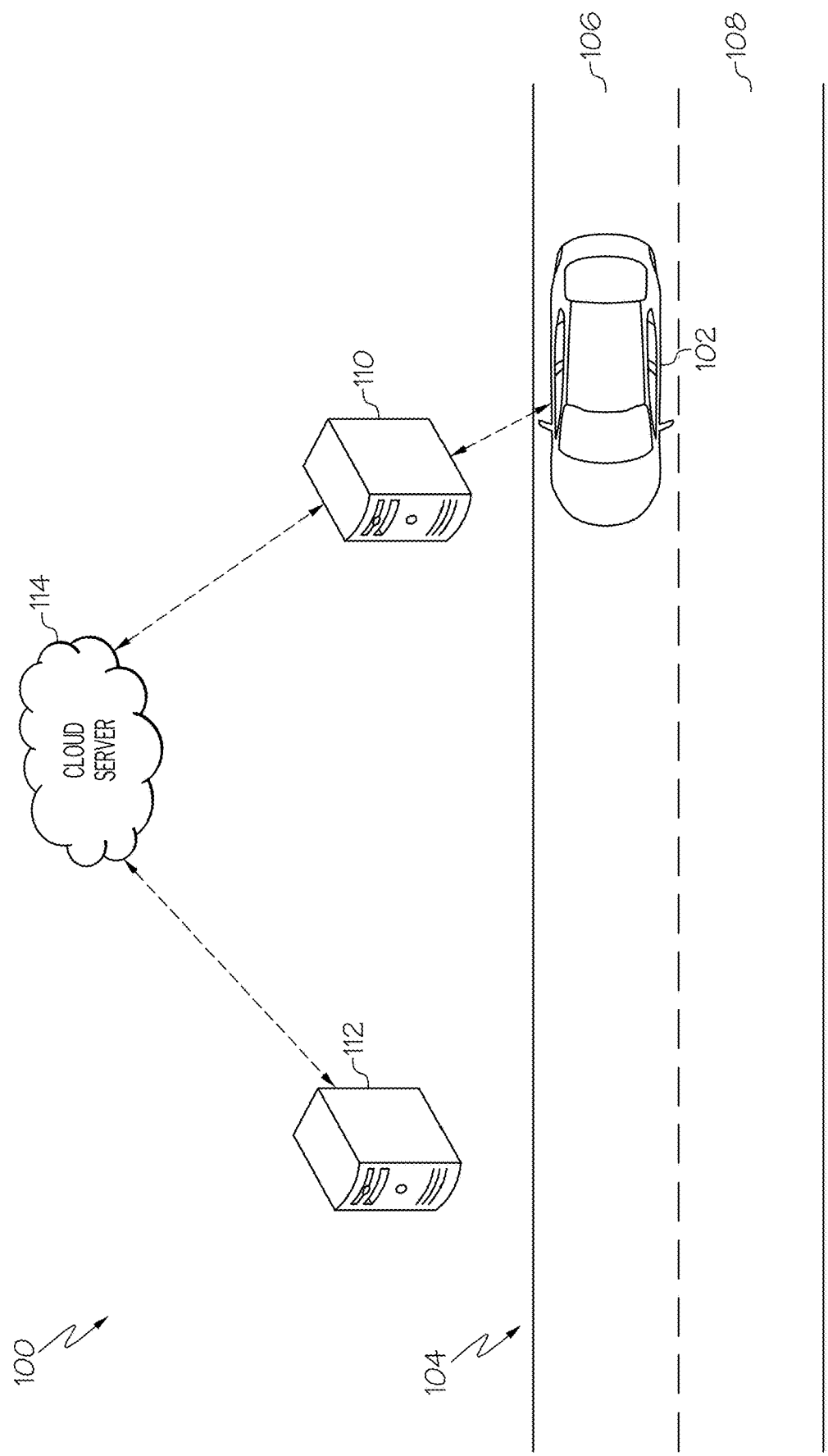
FIG. 1 depicts an example system for determining real-time lane level snow accumulation, according to one or more embodiments shown and described herein.

FIG. 1 depicts an example system 100 for determining real-time lane level snow accumulation. The system 100 includes a vehicle 102 that drives along a road 104 having lanes 106 and 108. While the example of FIG. 1 shows the road 104 having two lanes, it should be understood that in other examples, the vehicle 102 may drive along a road having any number of lanes. In some examples, the vehicle 102 may be an autonomous vehicle driven by computer control. In other examples, the vehicle 102 may be a non-autonomous vehicle driven by a human driver.

The system 100 of FIG. 1 further includes edge servers or edge computing devices 110 and 112 and a cloud server or cloud computing device 114. The edge server 110 is communicatively coupled to the vehicle 102. In some examples, the edge servers 110 and 112 may be fixed edge servers, e.g., road-side units (RSU), and may comprise any type of computing device capable of performing the functionalities described herein. In these examples, a variety of edge servers may be positioned at various locations along the road 104 or along other roads and each edge server may have a different coverage or service area. As such, as the vehicle 102 drives along the road and moves in and out of coverage areas of different edge servers, the vehicle 102 may communicate with different edge servers. For example, as illustrated in FIG. 1, the vehicle 102 is communicatively coupled to the edge server 110. However, as the vehicle 102 moves away from the edge server 110 and approaches the edge server 112, the vehicle 102 may disconnect from the edge server 110 and communicatively couple to the edge server 112.

In some examples, one or more of the edge servers 110 and 112 may be a moving edge server, e.g., another vehicle on the road 104. In some examples, the edge servers 110 and 112 may be positioned near the road 104 such that they may be communicatively coupled to the vehicle 102 or other vehicles on the road 104. In some examples, one or more of the functions performed by the edge servers 110 and 112 may be performed by the vehicle 102 and/or the cloud server 114.

As described in further detail below, the edge server 110 may receive snow accumulation data from the vehicle 102 and other vehicles and may aggregate the data received from each vehicle. The edge servers 110 and 112 may also be communicatively coupled to the cloud server 114, as explained in further detail below. In the illustrated example, the system 100 is shown comprising two edge servers. However, it should be understood that in other examples, the system 100 may comprise any number of edge servers.

Referring still to FIG. 1, in the illustrated example, the cloud server 114 is a cloud-based computing system. However, in other examples, the cloud server 114 may comprise any other type of computing system. In the illustrated example, the cloud server 114 transmits and receives data from the edge servers 110 and 112, as described in further detail below.

Figure 2:
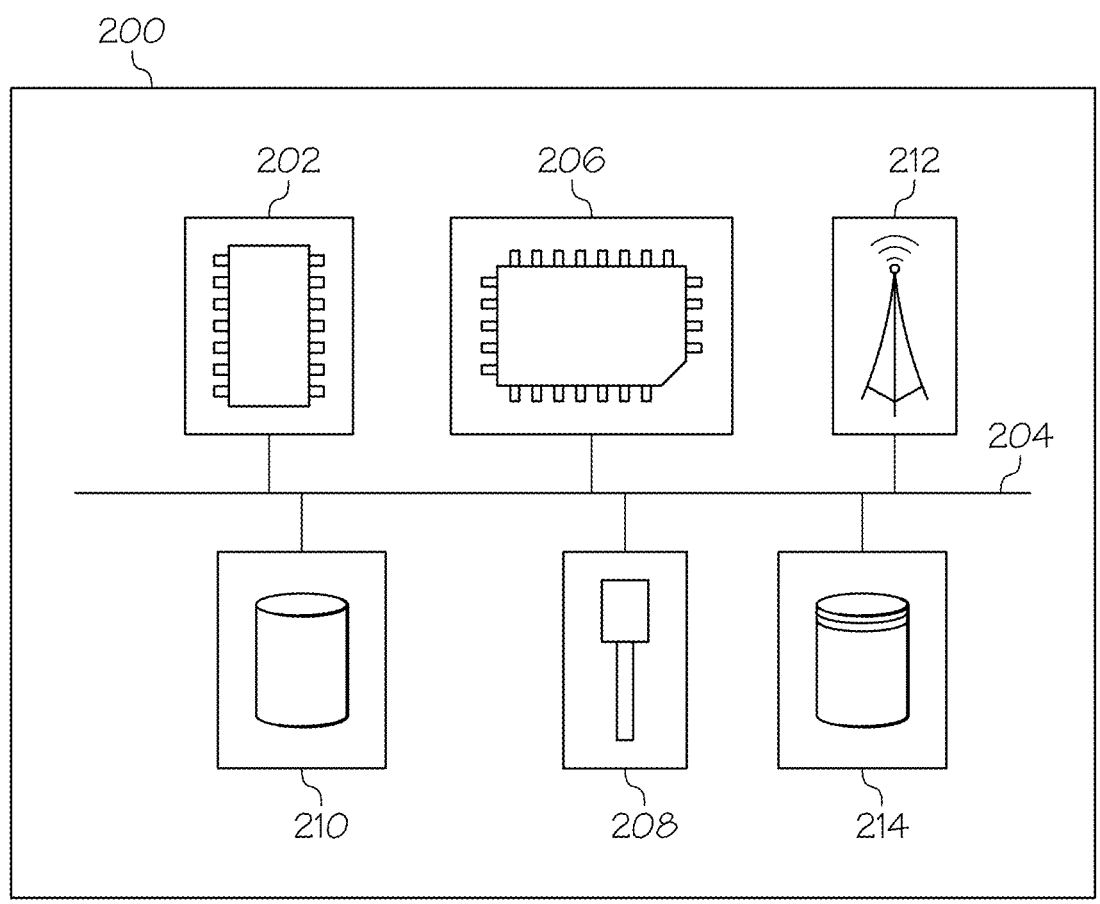
FIG. 2 depicts a schematic diagram of an example vehicle system, according to one or more embodiments shown and described herein.

FIG. 2 depicts an example vehicle system 200 included in the vehicle 102 of FIG. 1. The vehicle system 200 includes one or more processors 202, a communication path 204, one or more memory modules 206, a satellite antenna 208, one or more vehicle sensors 210, network interface hardware 212, and a data storage component 214, the details of which will be set forth in the following paragraphs. In examples where the vehicle 102 is an autonomous vehicle, the vehicle system 200 may also include one or more modules for performing autonomous driving of the vehicle 102. It should be understood that the vehicle system 200 of FIG. 2 is provided for illustrative purposes only, and that other vehicle systems 200 comprising more, fewer, or different components may be utilized.

Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the vehicle system 200. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The memory modules 206 of the vehicle system 200 are described in further detail below with respect to FIG. 3.

Referring still to FIG. 2, the example vehicle system 200 comprises a satellite antenna 208 coupled to the communication path 204 such that the communication path 204 communicatively couples the satellite antenna 208 to other modules of the vehicle system 200. The satellite antenna 208 is configured to receive signals from global positioning system satellites. Specifically, in one embodiment, the satellite antenna 208 includes one or more conductive elements that interact with electromagnetic signals transmitted by global positioning system satellites. The received signal is transformed into a data signal indicative of the location (e.g., latitude and longitude) of the satellite antenna 208 or an object positioned near the satellite antenna 208, by the one or more processors 202. Thus, the satellite antenna 208 allows the vehicle 102 to monitor its location.

The vehicle system 200 comprises one or more vehicle sensors 210. Each of the one or more vehicle sensors 210 is coupled to the communication path 204 and communicatively coupled to the one or more processors 202. The one or more vehicle sensors 210 may include, but are not limited to, LiDAR sensors, RADAR sensors, optical sensors (e.g., cameras, laser sensors, proximity sensors, location sensors), and the like. In some examples, the vehicle sensors 210 may be used to autonomously navigate the vehicle 102. In addition, the vehicle sensors 210 may capture images of the road 104 that may be used to determine snow accumulation levels, as described herein.

Still referring to FIG. 2, the vehicle system 200 comprises network interface hardware 212 for communicatively coupling the vehicle system 200 to the edge server 110. The network interface hardware 212 can be communicatively coupled to the communication path 204 and can be any device capable of transmitting and/or receiving data via a network. Accordingly, the network interface hardware 212 can include a communication transceiver for sending and/or receiving any wired or wireless communication. For example, the network interface hardware 212 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 212 includes hardware configured to operate in accordance with the Bluetooth® wireless communication protocol. The network interface hardware 212 of the vehicle system 200 may transmit data detected by the vehicle sensors 210 and other data to the edge server 110, as disclosed herein.

In some embodiments, the vehicle system 200 may be communicatively coupled to the edge server 110 by a network. In one embodiment, the network may include one or more computer networks (e.g., a personal area network, a local area network, or a wide area network), cellular networks, satellite networks and/or a global positioning system and combinations thereof. Accordingly, the vehicle system 200 can be communicatively coupled to the network via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Still referring to FIG. 2, the vehicle system 200 comprises a data storage component 214. The data storage component 214 may store data that may be utilized by the memory modules 206 and/or other components of the vehicle system 200. For example, the data storage component 214 may store HD map data of the road 104 and other roads. The data storage component 214 may also store learned parameters for a trained neural network, as described herein. Other data that may be stored in the data storage component 214 is described throughout this disclosure.

Figure 3:
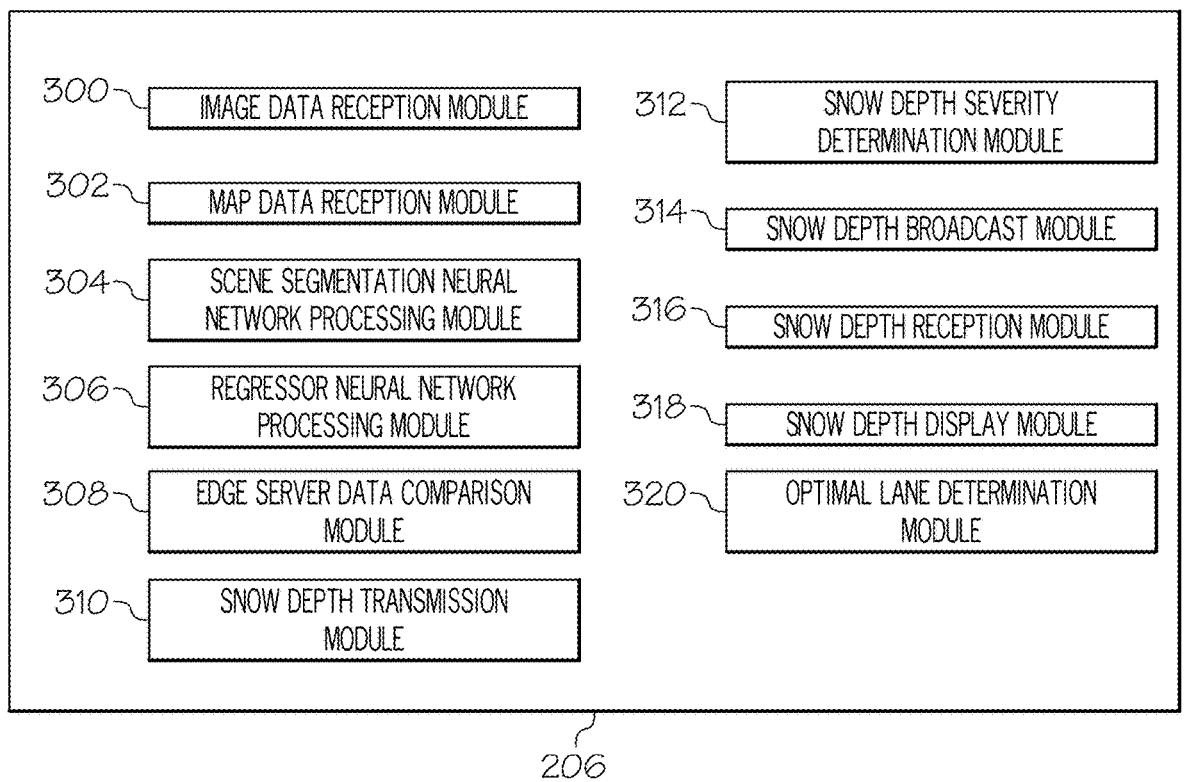
FIG. 3 depicts a schematic diagram of exemplary memory modules of the vehicle system of FIG. 2, according to one or more embodiments shown and described herein.

Now referring to FIG. 3, exemplary memory modules 206 of the vehicle system 200 are shown. The one or more memory modules 206 include an image data reception module 300, a map data reception module 302, a scene segmentation neural network processing module 304, a regressor neural network processing module 306, an edge server data comparison module 308, a snow depth transmission module 310, a snow depth severity determination module 312, a snow depth broadcast module 314, a snow depth reception module 316, a snow depth display module 318, and an optimal lane determination module 320. Each of the image data reception module 300, the map data reception module 302, the scene segmentation neural network processing module 304, the regressor neural network processing module 306, the edge server data comparison module 308, the snow depth transmission module 310, the snow depth severity determination module 312, the snow depth broadcast module 314, the snow depth reception module 316, the snow depth display module 318, and the optimal lane determination module 320 may be a program module in the form of operating systems, application program modules, and other program modules stored in the one or more memory modules 206. Such a program module may include, but is not limited to, routines, subroutines, programs, objects, components, data structures and the like for performing specific tasks or executing specific data types as will be described below.

Figure 12:
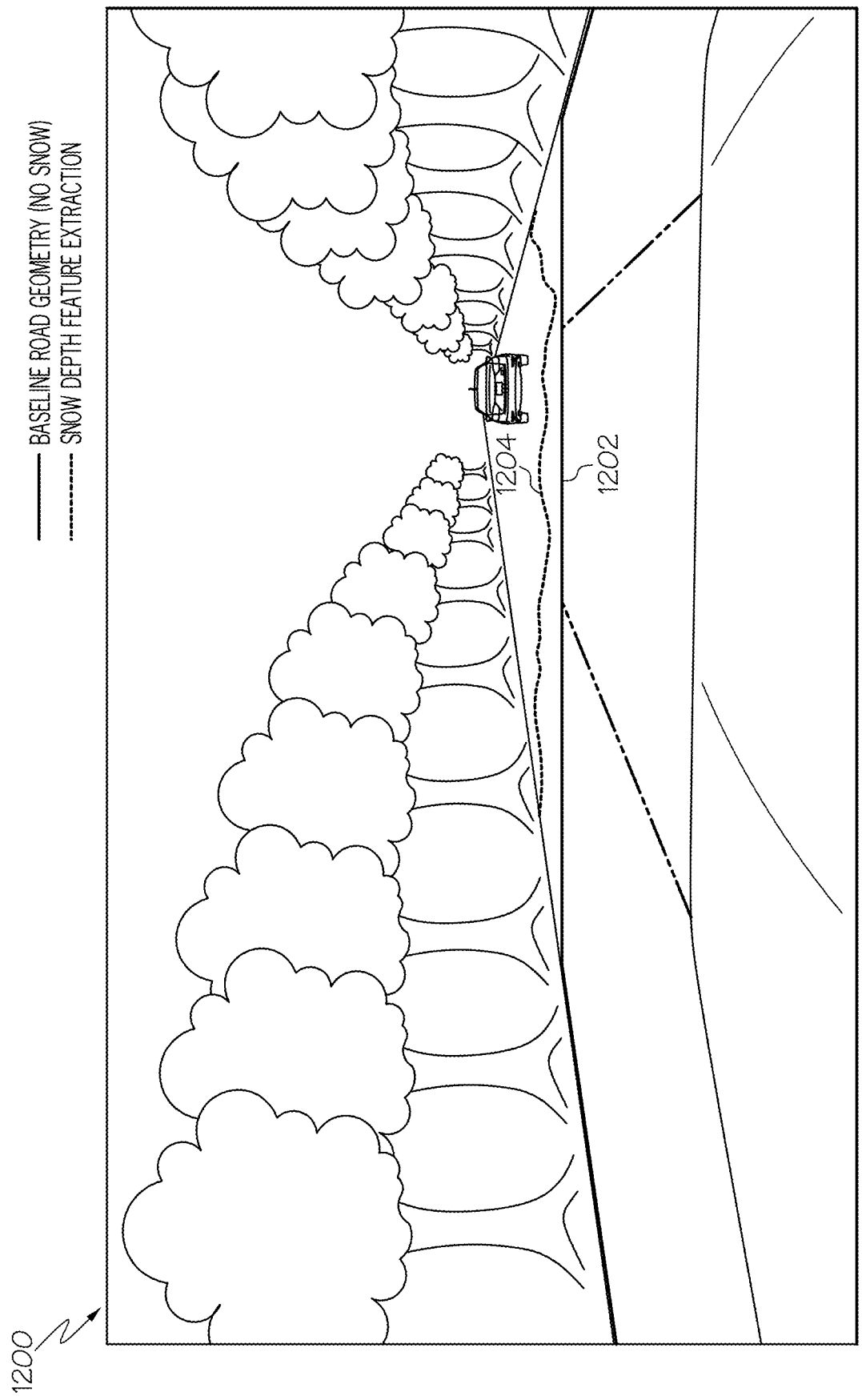
FIG. 12 depicts an exemplary image that may be captured by the vehicle system of FIG. 2, according to one or more embodiments shown and described herein.

The image data reception module 300 may receive images captured by the vehicle sensors 210 of the vehicle system 200. In the example of FIG. 1, the images received by the image data reception module 300 may comprise images of the road 104 along which the vehicle 102 is driving. In particular, the images received by the image data reception module 300 may comprise images of the road 104 in front of the vehicle 102. The images captured by the vehicle sensors 210 and received by the image data reception module 300 may show snow accumulation on the road 104. FIG. 12 shows an example image 1200 that may be received by the image data reception module 300. The images received by the image data reception module 300 may be used to determine lane-level snow accumulation as described herein.

Referring back to FIG. 3, the map data reception module 302 may receive an HD map of a road along which the vehicle 102 drives (e.g., the road 104 in the example of FIG. 1). In some examples, the map data reception module 302 may receive a locally stored HD map from the data storage component 214. In other examples, the map data reception module 302 may receive a map from the edge server 110, the cloud server 114, or other remote computing devices (e.g., a map server). The HD map received by the map data reception module 302 may include road geometry of the road 104 in non-snowy conditions (e.g., when there is no snow on the road). FIG. 12 shows an example road geometry 1202 of a road that may be included in an HD map received by the map data reception module 302. The HD map and road geometry information therein received by the map data reception module 302 may be used along with the images received by the image data reception module 300 to determine lane-level snow accumulation as described herein.

Figure 13:
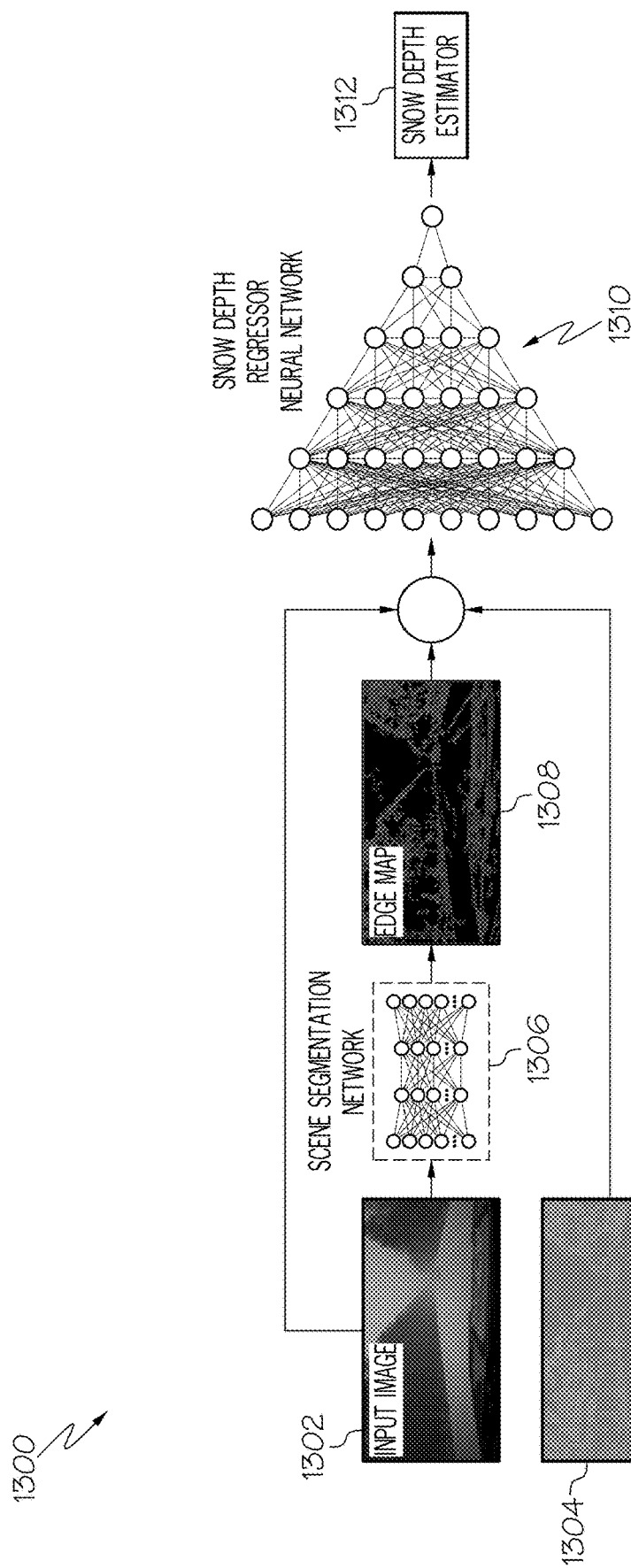
FIG. 13 depicts an exemplary neural network architecture, according to one or more embodiments shown and described herein.

Referring back to FIG. 3, the scene segmentation neural network processing module 304 may input an image received by the image data reception module 300 into a trained scene segmentation neural network. The scene segmentation neural network may then output an edge map based on the input image. FIG. 13 shows an example neural network architecture 1300. In the example of FIG. 13, an input image 1302 is input into a scene segmentation neural network 1306, which outputs an edge map 1308 based on the input image 1302.

The output of the scene segmentation neural network 1306 may be an edge map that indicates the edges of objects and boundaries between different objects in the input image 1302. For example, an edge map may identify lane markings as well as other boundaries and roadside landmarks (e.g., traffic signs, light poles, and the like). In some examples, the scene segmentation neural network 1306 may be a pre-trained neural network. In other examples, the parameters of the scene segmentation neural network 1306 may be trained based on sample data collected by the vehicle sensors 210. The scene segmentation neural network 1306 may comprise any type of neural network. The parameters of the scene segmentation neural network 1306 may be stored in the data storage component 214.

Referring back to FIG. 3 in conjunction with FIG. 13, the regressor neural network processing module 306 may input the image 1302 received by the image data reception module 300, the HD map 1304 received by the map data reception module 302, and the output of the scene segmentation neural network 1306 determined by the scene segmentation neural network processing module 304 into a regressor neural network 1310, as shown in FIG. 13. The regressor neural network 1310 may then output an estimated snow depth 1312 for each lane of the road in the image 1302.

In the illustrated example, the regressor neural network 1310 comprises a fully connected deep neural network. However, in other examples, the regressor neural network 1310 may comprise any neural network architecture having any number of hidden layers and any number of nodes in each layer. The regressor neural network 1310 takes as an input an input image of a road, an HD map indicating the road geometry of the road, and an edge map of the input image (e.g., as determined by the scene segmentation neural network 1306). The regressor neural network 1310 outputs an estimated snow depth for each lane in the input image. FIG. 12 shows an example snow depth 1204 determined by the regressor neural network 1310 across the three lanes of the road on which the vehicle 102 is driving.

Referring to FIG. 13, the regressor neural network 1310 may be trained using supervised learning techniques on training data comprising example input images and corresponding HD maps. The training data may comprise associated ground truth labels comprising snow depth values for each lane in each example input image measured during snowy conditions. After the regressor neural network 1310 is trained, the learned parameters may be stored in the data storage component 214 of the vehicle system 200. By inputting captured images as well as HD maps comprising road geometry, the regressor neural network 1310 may learn to distinguish between road geometry without snow and road geometry with snow in order to speed up convergence during training of the regressor neural network 1310.

Referring back to FIG. 3, the edge server data comparison module 308 compares the estimated snow depths determined by the regressor neural network processing module 306 to snow depths recently received from the edge server 110 (as explained below). In embodiments, the edge server data comparison module 308 determines whether the difference between the snow depths determined by the regressor neural network processing module 306 and the snow depths received from the edge server 110 are above a threshold value. In some embodiments, if the difference determined by the edge server data comparison module 308 is above the threshold value, indicating a significant difference between snow depths estimated by the edge server 110 and the snow depths estimated by the vehicle system 200, then the snow depth transmission module 310 may transmit the snow depths determined by the regressor neural network processing module 306 to the edge server 110. The snow depth transmission module 310 may also transmit a timestamp and location associated with the vehicle 102 when the snow depth estimate was determined. If the difference determined by the edge server data comparison module 308 is at or below the threshold value, the snow depth transmission module 310 may withhold transmitting the snow depths determined by the regressor neural network processing module 306 to the edge server 110 to conserve bandwidth.

The snow depth severity determination module 312 may determine the severity of the snow depth determined by the regressor neural network processing module 306. For example, the snow depth severity determination module 312 may determine whether the snow depth determined by the regressor neural network processing module 306 is above a severity threshold (e.g., one inch), indicating that the determined snow conditions are severe and the road 104 is particularly dangerous. If the snow depth severity determination module 312 determines that the snow depth determined by the regressor neural network processing module 306 is above the severity threshold, the snow depth broadcast module 314 may broadcast a signal to nearby vehicles indicating the severe and dangerous road conditions. This may allow these other vehicles to take appropriate driving precautions without the need for the edge server 110 to be involved. In the illustrated example, the snow depth broadcast module 314 transmits a signal to nearby vehicles using vehicle-to-vehicle (V2V) communications. In other examples, the snow depth broadcast module 314 may transmit a signal to nearby vehicles using other forms of communications.

The snow depth reception module 316 receives snow depths for each lane of the road 104 from the edge server 110. As explained in further detail below, the edge server 110 aggregates snow depth determinations made by a plurality of vehicles and averages them together. As such, the edge server 110 may determine a more accurate snow depth than that determined by the vehicle system 200. In particular, if any one vehicle inaccurately determines a snow depth (e.g., due to mechanical error, software error, or other types of bias), the edge server 110 will likely determine a more accurate snow depth measurement by averaging the inaccurate snow depth determination from that one vehicle with accurate snow depth determinations from other vehicles or eliminating an outlier and averaging the remaining depth measurements. As such, it may be advantageous for the vehicle system 200 to rely on snow depth data from the edge server 110 rather than snow depth data determined by the vehicle system 200. The snow depth data received by the snow depth reception module 316 from the edge server 110 may also include predicted future snow accumulation, as explained in further detail below.

The snow depth display module 318 may display the snow depth data received by the snow depth reception module 316 from the edge server 110. This snow depth data may be displayed in a heads up display or a dashboard display, or at any other location in the vehicle 102 such that it may be viewed by the driver of the vehicle 102. In some examples, the snow depth display module 318 may display the snow depth data received by the snow depth reception module 316 such that a simulated level of the aggregate snow depth for one or more lanes is visible to a driver of the vehicle.

Figure 14:
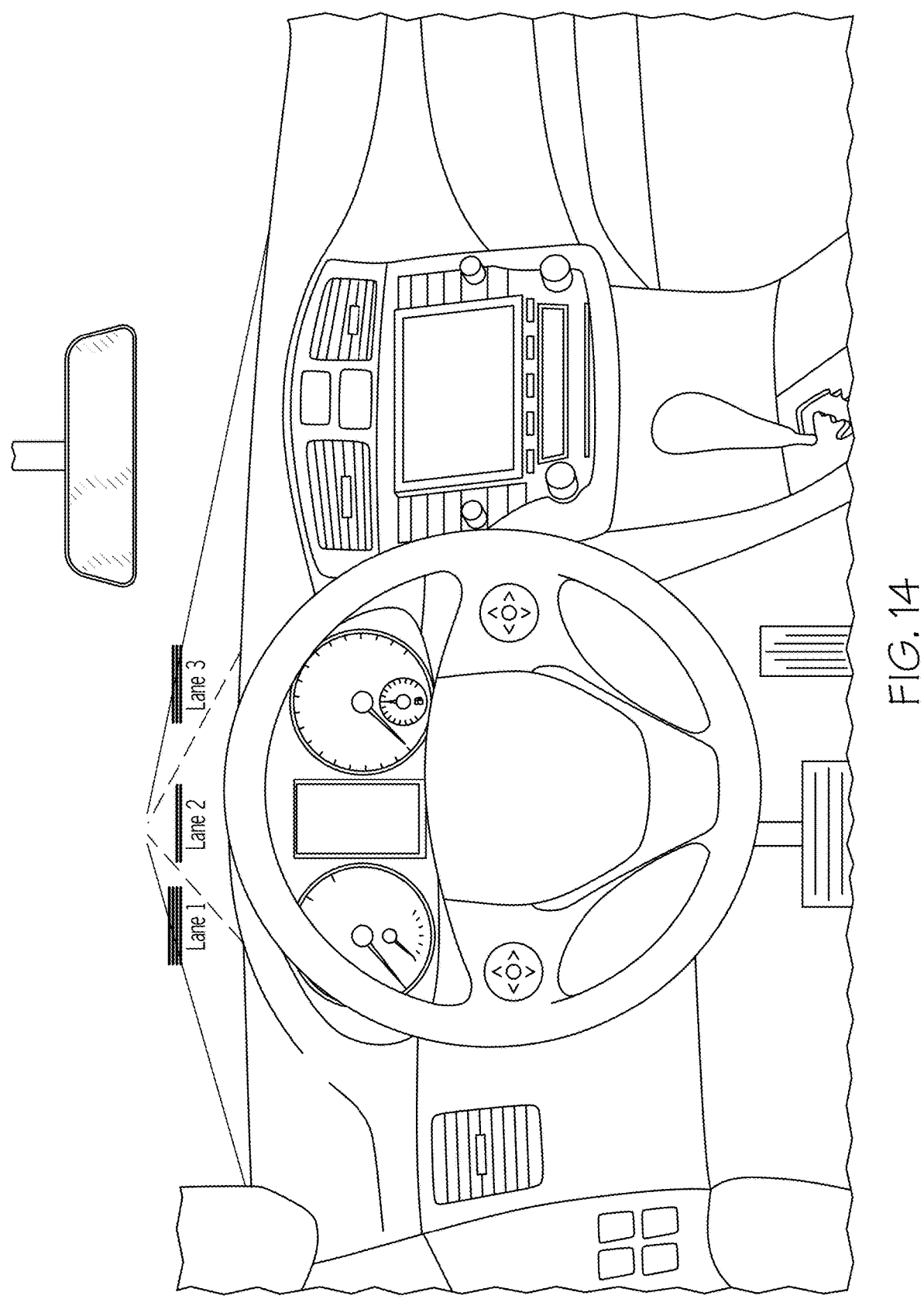
FIG. 14 depicts an example heads-up display for indicating an optimal lane, according to one or more embodiments shown and described herein.

In some examples, the optimal lane determination module 320 may determine an optimal lane for the vehicle 102 to drive in based on the data received by the snow depth reception module 316. For example, the optimal lane determination module 320 may determine that the lane having the smallest snow depth ahead of the vehicle 102 is the optimal lane for the vehicle 102 to drive in. In these examples, the snow depth display module 318 may display an indication of which lane the driver of the vehicle 102 should use, as shown in FIG. 14. FIG. 14 shows an example heads up display on the vehicle 102 in which three lanes are annotated. In the example of FIG. 14, lanes 1 and 3 have a first annotation indicating that they are not the optimal lanes for the vehicle 102 to use and lane 2 has a second annotation indicating that it is the optimal lane for the vehicle 102 to use. The lanes may be annotated with different colors or in other ways to indicate a preferred lane. The heads up display may display simulated levels of the aggregate snow depth for lanes 1, 2, and 3. For example, a bar graph or other indication illustrating a level of snow depth may be displayed for each lane. The bar graphs or other indication may overlap with actual lanes when viewed from the perspective from the driver of the vehicle 102 such that the driver may easily recognize the level of snow depth in each lane. In some examples, the optimal lane determination module 320 may instruct the vehicle 102 to follow the optimal lane autonomously.

Figure 4:
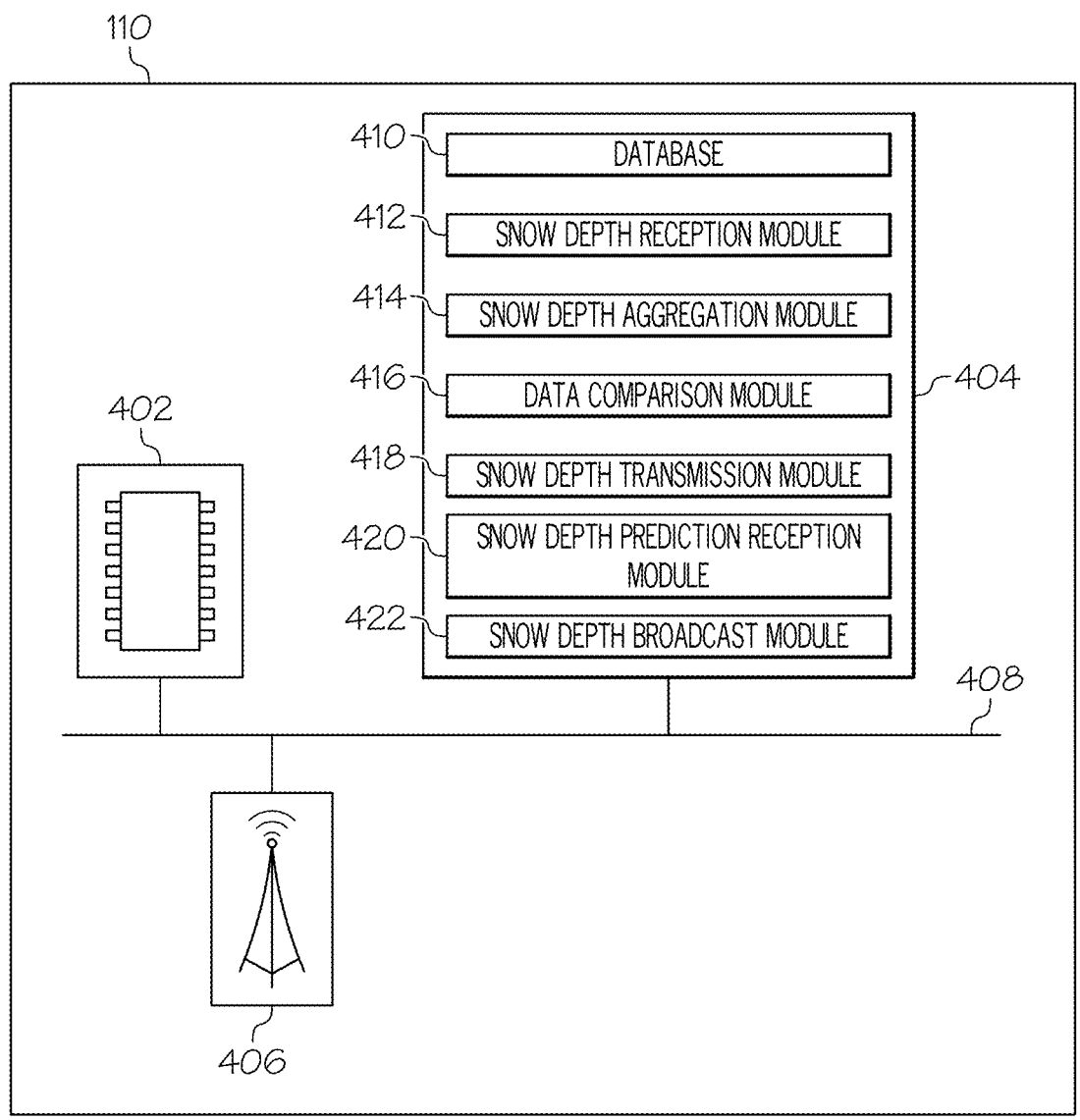
FIG. 4 depicts a schematic diagram of an example edge computing device, according to one or more embodiments shown and described herein.

Now referring to FIG. 4, the edge server 110 comprises one or more processors 402, one or more memory modules 404, network interface hardware 406, and a communication path 408. The one or more processors 402 may be a controller, an integrated circuit, a microchip, a computer, or any other computing device. The one or more memory modules 404 may comprise RAM, ROM, flash memories, hard drives, or any device capable of storing machine readable and executable instructions such that the machine readable and executable instructions can be accessed by the one or more processors 402. The communication path 408 provides signal interconnectivity between various modules of the edge server 110.

The network interface hardware 406 can be communicatively coupled to the communication path 408 and can be any device capable of transmitting and/or receiving data via a network. Accordingly, the network interface hardware 406 can include a communication transceiver for sending and/or receiving any wired or wireless communication. For example, the network interface hardware 406 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 406 includes hardware configured to operate in accordance with the Bluetooth® wireless communication protocol. The network interface hardware 406 of the edge server 110 may transmit and receive data to and from the vehicle 102 and to and from the cloud server 114.

The one or more memory modules 404 include a database 410, a snow depth reception module 412, a snow depth aggregation module 414, a data comparison module 416, a snow depth transmission module 418, a snow depth prediction reception module 420, and a snow depth broadcast module 422. Each of the database 410, the snow depth reception module 412, the snow depth aggregation module 414, the data comparison module 416, the snow depth transmission module 418, the snow depth prediction reception module 420, and the snow depth broadcast module 422 may be a program module in the form of operating systems, application program modules, and other program modules stored in one or more memory modules 404. In some embodiments, the program module may be stored in a remote storage device that may communicate with the edge server 110. Such a program module may include, but is not limited to, routines, subroutines, programs, objects, components, data structures and the like for performing specific tasks or executing specific data types as will be described below.

The database 410 may temporarily or permanently store snow accumulation data received from vehicles (e.g., the vehicle 102) and/or the cloud server 114. In addition, the database 410 may store other data to be used by the memory modules 404 to ensure their proper functionality, as described herein.

The snow depth reception module 412 may receive snow depth data from vehicles, such as the vehicle 102. The snow depth data received by the snow depth reception module 412 from a vehicle may include snow depth data determined by a vehicle system of the vehicle, as described above. The snow depth data received by the snow depth reception module 412 may also include a location and timestamp associated with the vehicle sending the snow depth data. This may allow the edge server 110 to keep track of and properly aggregate the snow accumulation data received from a plurality of vehicles. The snow depth data received by the snow depth reception module 412 may be stored in the database 410.

The snow depth aggregation module 414 may aggregate snow depth data associated with a particular road received from a plurality of vehicles. As described above, the vehicle 102 may estimate snow depth for the road 104 using the techniques described herein. Other vehicles that drive along the road 104 may also estimate snow depths for the road 104. However, there may be variations in the snow depths reported by different vehicles due to mechanical or software errors, variability in conditions under which the estimations were obtained, random noise, and other factors. As such, the snow depth aggregation module 414 may aggregate data received from multiple vehicles in order to reduce bias and obtain a more accurate estimate of snow depth for the lanes of the road 104. In the illustrated example, the snow depth aggregation module 414 may aggregate the snow depths received from multiple vehicles by averaging the snow depths estimates received from each vehicle. In other examples, the snow depth aggregation module 414 may use other methods to aggregate the received snow depths. For example, the snow depth aggregation module 114 may determine a weighted average of snow depths by applying different weights to snow depths received from different vehicles (e.g., based on the time that the snow depths were received or other factors).

After the snow depth aggregation module 414 determines an aggregate snow depth for a road, the data comparison module 416 may compare the determined aggregate snow depth to the aggregate snow depth most recently transmitted to the cloud server 114 (as explained below). In particular, the data comparison module 416 may determine whether the difference between the snow depth determined by the snow depth aggregation module 414 and the snow depth most recently transmitted to the cloud server 114 is above a threshold value. If the difference determined by the data comparison module 416 is above the threshold value, this indicates that the snow depth for the road in question has markedly changed since the last transmission to the cloud server 114. As such, the snow depth transmission module 418 may transmit the newly determined aggregate snow depth to the cloud server 114.

Alternatively, if the difference determined by the data comparison module 416 is at or below the threshold value, this indicates that the snow depth for the road in question has not markedly changed since the last transmission to the cloud server 114. Thus, the snow depth transmission module 418 may not transmit the recently determined aggregate snow depth to the cloud server 114. Accordingly, the cloud server 114 receives an update whenever the aggregate snow depth determined by the edge server 110 markedly changes. However, the cloud server 114 does not receive an update when the aggregate snow depth determined by the edge server 110 does not markedly change, thereby reducing bandwidth usage.

The snow depth prediction reception module 420 may receive future predictions regarding snow accumulation from the cloud server 114, as discussed in further detail below. The predictions regarding snow accumulations received by the snow depth prediction reception module 420 may be stored in the database 410.

The snow depth broadcast module 422 may transmit estimated lane-level snow depth values to each connected vehicle within the coverage area of the edge server 110. In particular, the snow depth broadcast module 422 may transmit, to each vehicle within the coverage area of the edge server 110, estimated snow depth values for each lane of the road on which each vehicle is driving. In some examples, the estimated snow depths transmitted by the snow depth broadcast module 422 may include the predicted future snow accumulation received by the snow depth prediction reception module 420.

Figure 5:
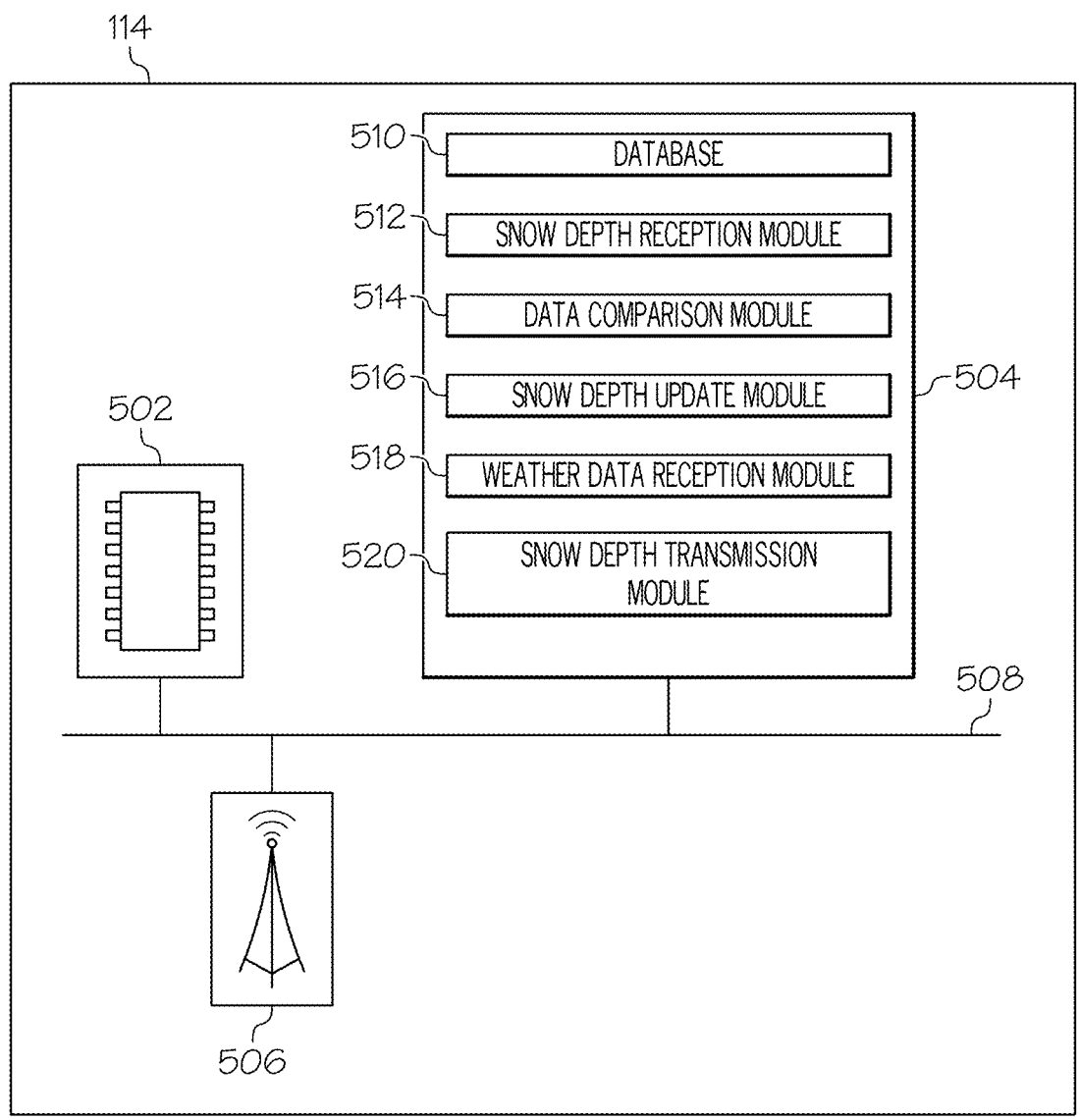
FIG. 5 depicts a schematic diagram of an example cloud computing device, according to one or more embodiments shown and described herein.

Now referring to FIG. 5, the cloud server 114 comprises one or more processors 502, one or more memory modules 504, network interface hardware 506, and a communication path 508. The one or more processors 502 may be a controller, an integrated circuit, a microchip, a computer, or any other computing device. The one or more memory modules 504 may comprise RAM, ROM, flash memories, hard drives, or any device capable of storing machine readable and executable instructions such that the machine readable and executable instructions can be accessed by the one or more processors 502. The communication path 508 provides signal interconnectivity between various modules of the cloud server 114.

The network interface hardware 506 can be communicatively coupled to the communication path 508 and can be any device capable of transmitting and/or receiving data via a network. Accordingly, the network interface hardware 506 can include a communication transceiver for sending and/or receiving any wired or wireless communication. For example, the network interface hardware 506 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 506 includes hardware configured to operate in accordance with the Bluetooth® wireless communication protocol. The network interface hardware 506 of the cloud server 114 may transmit and receive data to and from the edge server 110.

The one or more memory modules 504 include a database 510, a snow depth reception module 512, a data comparison module 514, a snow depth update module 516, a weather data reception module 518, and a snow depth transmission module 520. Each of the database 510, the snow depth reception module 512, the data comparison module 514, the snow depth update module 516, the weather data reception module 518, and the snow depth transmission module 520 may be a program module in the form of operating systems, application program modules, and other program modules stored in one or more memory modules 504. In some embodiments, the program module may be stored in a remote storage device that may communicate with the cloud server 114. Such a program module may include, but is not limited to, routines, subroutines, programs, objects, components, data structures and the like for performing specific tasks or executing specific data types as will be described below.

The database 510 may temporarily or permanently store snow accumulation data received from edge servers (e.g., the edge servers 110 and 112). In particular, the database 510 may store a comprehensive aggregated map of snow accumulation across a particular geographic region based on snow depth data received from the edge servers that are part of the system 100. In addition, the database 510 may store other data to be used by the memory modules 504 to ensure their proper functionality, as described herein.

The snow depth reception module 512 may receive snow depth data from one or more edge servers (e.g., the edge servers 110 and 112). Specifically, the snow depth reception module 512 may receive snow depths determined by edge servers using the techniques described above. The snow depths received by the snow depth reception module 512 may be associated with one or more roads and one or more lanes on each of those roads. The snow depths received by the snow depth reception module 512 may be used by the cloud server 114 to maintain a comprehensive aggregated map of snow accumulation levels. The snow accumulation levels on the map maintained by the cloud server 114 may include current snow depths (e.g., snow depths received by the snow depth reception module 512 from edge servers) and future predicted snow accumulations, as described below.

When the snow depth reception module 512 receives snow depth data for a particular road, the data comparison module 514 compares the received snow depths to the stored snow depths for that road (e.g., as stored in the database 510). In particular, the data comparison module 514 may determine whether the difference between the snow depth received by the snow depth reception module 512 and the snow depth recorded by the cloud server 114 for that road is above a threshold value. If the data comparison module 514 determines that the difference is above the threshold value, the snow depth update module 516 may update the snow depth data stored in the database 510 indicating the snow depth for the road. Alternatively, if the data comparison module 514 determines that the difference is at or below the threshold value, the snow depth update module 516 may not update the snow depth data stored in the database 510 in order to conserve computing resources when the snow depth values have not significantly changed.

The weather data reception module 518 may receive weather forecasts for one or more geographic areas covered by the system 100. These weather forecasts may include predicted future snowfall. As such, the weather data reception module 518 may receive data associated with predicted future snowfall. The snow depth update module 516 may then update the snow depth map stored in the database 510 to include future predicted snow depths based on the weather data received by the weather data reception module 518.

The snow depth transmission module 520 may transmit snow depth data to the edge servers that are part of the system 100 (e.g., the edge servers 110 and 112). In particular, the snow depth transmission module 520 may transmit future predicted snow depths to edge servers based on data received by the weather data reception module 518. In some examples, the snow depth transmission module 520 may only transmit snow depth data to a particular edge server upon a trigger event. For example, the snow depth transmission module 520 may only transmit data to an edge server after receiving snow depth data from that edge server. This may help reduce communication bandwidth.

Figure 6:
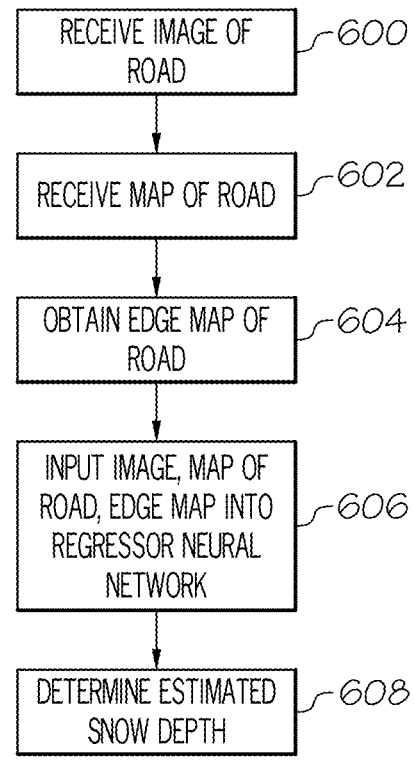
FIG. 6 depicts a flow chart of an example method of determining real-time lane level snow accumulation, according to one or more embodiments shown and described herein.

FIG. 6 depicts a flowchart of an example method for operating the example vehicle system 200, according to one or more embodiments shown and described herein. At step 600, the image data reception module 300 receives an image of the road 104 captured by the vehicle 102 driving on the road 104. The image may be captured by the vehicle sensors 210 (e.g., a camera).

At step 602, the map data reception module 302 receives a map of the road 104. The map of the road 104 may comprise a road geometry. The map of the road 104 may be stored in the data storage component 214.

At step 604, the scene segmentation neural network processing module 304 obtains an edge map of the road 104 based on the image of the road. The scene segmentation neural network may obtain the edge map of the road 104 by inputting the image of the road 104 into a trained scene segmentation neural network.

At step 606, the regressor neural network processing module 306 inputs the image, the map of the road, and the edge map into a trained regressor neural network. The regressor neural network may be trained using supervised learning techniques with training data having ground truth labels comprising measurements of snow depths.

At step 608, the regressor neural network processing module 306 determines an estimated snow depth for each of one or more lanes of the road 104 based on an output of the regressor neural network.

Figure 7:
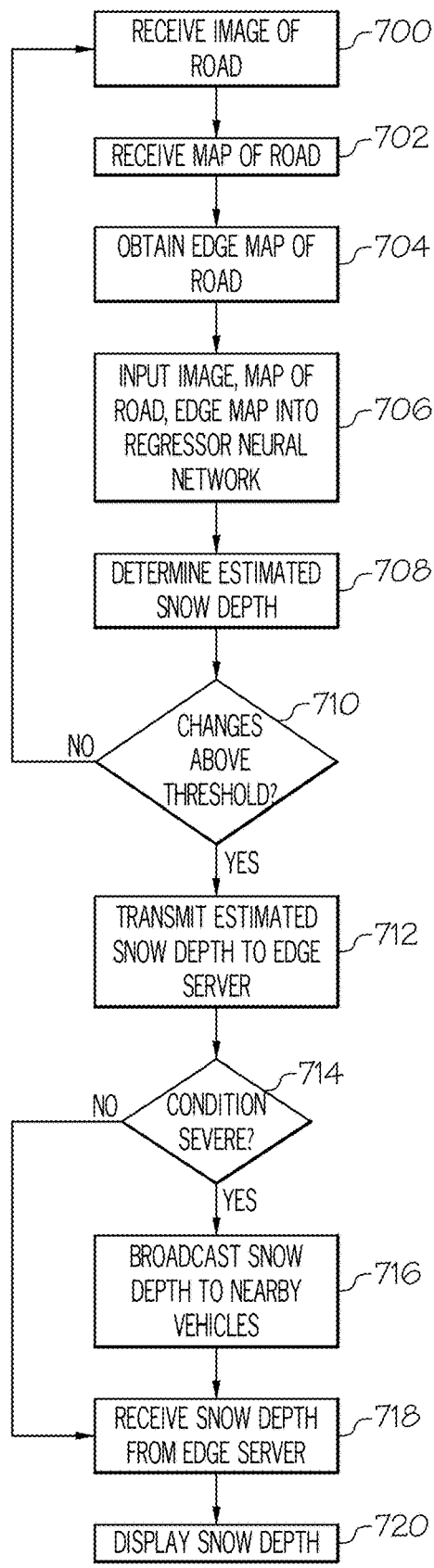
FIG. 7 depicts a flow chart of another example method of determining real-time lane level snow accumulation, according to one or more embodiments shown and described herein.

FIG. 7 depicts a flowchart of another example method for operating the example vehicle system 200, according to one or more embodiments shown and described herein. At step 702, the map data reception module 302 receives a map of the road 104. At step 704, the scene segmentation neural network processing module 304 obtains an edge map of the road 104 based on the image of the road. At step 706, the regressor neural network processing module 306 inputs the image, the map of the road, and the edge map into a trained regressor neural network. At step 708, the regressor neural network processing module 306 determines an estimated snow depth for each of one or more lanes of the road 104 based on an output of the regressor neural network.

At step 710, the edge server data comparison module 308 determines a difference between an estimated snow depth for the one or more lanes of the road 104 and an aggregate snow depth for the one or more lanes of the road 104 previously received from the edge computing device 110 and determines whether the difference is greater than a threshold value. If the edge server data comparison module 308 determines that the difference is not greater than the threshold value (no at step 710), then control returns to step 700. If the edge server data comparison module 308 determines that the difference is greater than the threshold value (yes at step 710), then, at step 712, the snow depth transmission module 310 transmits the estimated snow depth to the edge computing device 110.

At step 714, the snow depth severity determination module 312 determines whether a condition of the road 104 is severe based on the estimated snow depth for the one or more lanes of the road 104. The snow depth severity determination module 312 may determine that the condition of the road 104 is severe when the estimated snow depth for at least one lane of the one or more lanes of the road 104 is above a threshold value. If the snow depth severity determination module 312 determines that the condition of the road 104 is severe (yes at step 714), then at step 716, the snow depth broadcast module 314 the estimated snow depth to one or more nearby vehicles. If the snow depth severity determination module 312 determines that the condition of the road 104 is not severe (no at step 714), then control passes to step 718.

At step 718, the snow depth reception module 316 receives an aggregate snow depth for the one or more lanes of the road 104 from the edge computing device 110. At step 720, the snow depth display module 318 displays the aggregate snow depth for the one or more lanes of the road 104 such that it is visible to a driver of the vehicle 102. In some examples, the optimal lane determination module 320 determines an optimal lane of the road 104 for the vehicle 102 to drive in based on the aggregate snow depth for the one or more lanes of the road 104. In these examples, the snow depth display module 318 may display an indication of the optimal lane such that it is visible to a driver of the vehicle 102.

Figure 8:
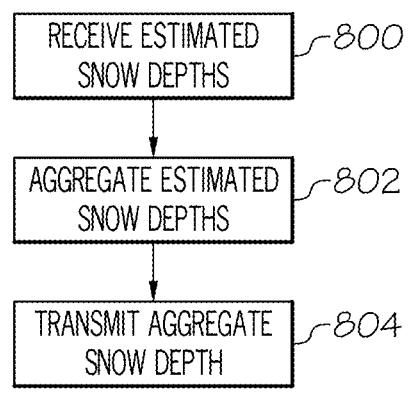
FIG. 8 depicts a flow chart of another example method of determining real-time lane level snow accumulation, according to one or more embodiments shown and described herein

FIG. 8 depicts a flowchart of an example method for operating the example edge server 110, according to one or more embodiments shown and described herein. At step 800, the snow depth reception module 412 receives, from one or more first vehicles, an estimated snow depth for each of one or more lanes of a road on which the one or more first vehicles are driving.

At step 802, the snow depth aggregation module 414 aggregates the estimated snow depth from each of the one or more first vehicles to determine an aggregate snow depth for the one or more lanes of the road.

At step 804, the snow depth transmission module 418 transmits the aggregate snow depth to one or more second vehicles.

Figure 9:
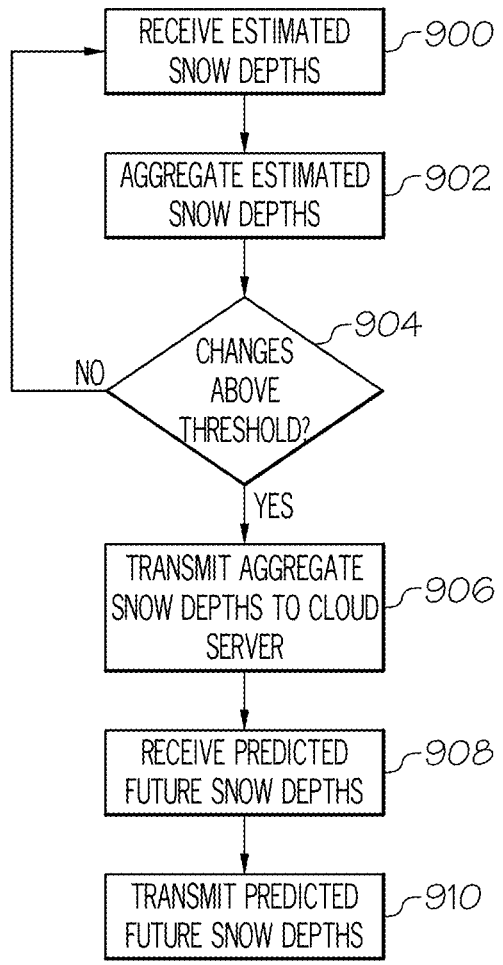
FIG. 9 depicts a flow chart of another example method of determining real-time lane level snow accumulation, according to one or more embodiments shown and described herein.

FIG. 9 depicts a flowchart of another example method for operating the example edge server 110, according to one or more embodiments shown and described herein. At step 900, the snow depth reception module 412 receives, from one or more first vehicles, an estimated snow depth for each of one or more lanes of a road on which the one or more first vehicles are driving.

At step 902, the snow depth aggregation module 414 aggregates the estimated snow depth from each of the one or more first vehicles to determine an aggregate snow depth for the one or more lanes of the road.

At step 904, the data comparison module 416 determines a difference between the aggregate snow depth and an aggregate snow depth previously transmitted to the cloud computing device 114 and determines whether the difference is above threshold. If the data comparison module 416 determines that the difference is not greater than the threshold (no at step 904), then control returns to step 900. If the data comparison module 416 determines that the difference is greater than the threshold (yes at step 904), then, at step 906, the snow depth transmission module 418 transmits the aggregate snow depth to the cloud computing device 114.

At step 908, the snow depth prediction reception module 420 receives a predicted future snow depth for each of the one or more lanes of the road from the cloud computing device 114. At step 910, the snow depth broadcast module 422 transmits the predicted future snow depth for each of the one or more lanes to the one more second vehicles.

Figure 10:
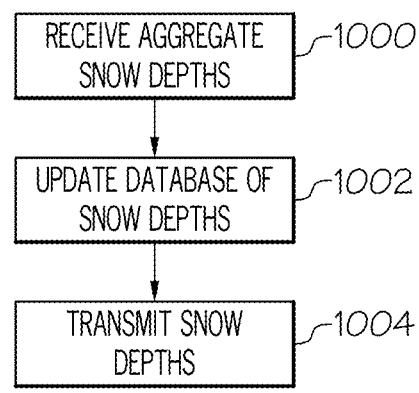
FIG. 10 depicts a flow chart of another example method of determining real-time lane level snow accumulation, according to one or more embodiments shown and described herein.

FIG. 10 depicts a flowchart of an example method for operating the example cloud server 114, according to one or more embodiments shown and described herein. At step 1000, the snow depth reception module 512 receives, from one or more edge computing devices, aggregate snow depths for each of one or more lanes of a plurality of roads.

At step 1002, the snow depth update module 516 updates the database 510 comprising estimated snow depths for each of the plurality of roads based on the aggregate snow depths for each of the one or more lanes of the plurality of roads received from the one or more edge computing devices. At step 1004, the snow depth transmission module 520 transmits the snow depths of the one or more lanes of the plurality of roads to at least one of the one or more edge computing devices. For each of the second plurality of roads, the snow depth transmission module 520 may transmit the snow depth of a road to each edge computing device having a coverage area that encompasses the road.

Figure 11:
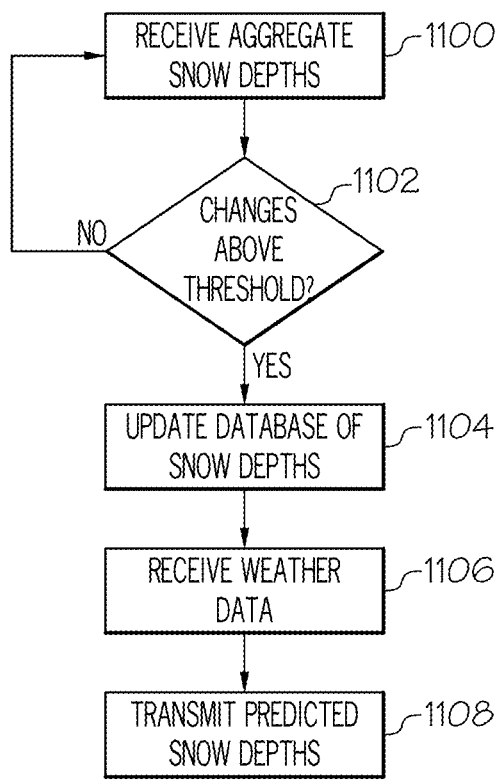
FIG. 11 depicts a flow chart of another example method of determining real-time lane level snow accumulation, according to one or more embodiments shown and described herein.

FIG. 11 depicts a flowchart of another example method for operating the example cloud server 114, according to one or more embodiments shown and described herein. At step 1100, the snow depth reception module 512 receives, from one or more edge computing devices, aggregate snow depths for each of one or more lanes of a plurality of roads.

At step 1102, the data comparison module 514 determines a difference between an aggregate snow depth of a first lane of a first road received from a first edge computing device and a snow depth of the first road stored in the database 510 and determines whether the difference is greater than a threshold value. If the data comparison module 514 determines that the difference is not greater than the threshold value (no at step 1102), then control returns to step 1100. If the data comparison module 514 determines that the difference is greater than the threshold value (yes at step 1102), then, at step 1104, the snow depth update module 516 updates the snow depth of the first lane of the first road in the database 510 to be the aggregate snow depth.

At step 1106, the weather data reception module 518 receives weather data associated with a geographic area containing one or more of the second plurality of roads, determines a predicted snow accumulation at a future time for at least one of the second plurality of roads based on the weather data, and stores the predicted snow accumulation at the future time for the at least one of the second plurality of roads in the database 510. At step 1108, the snow depth transmission module 520 transmits the predicted snow accumulation at the future time to at least one of the one or more edge computing devices.

It should now be understood that embodiments described herein are directed to systems and methods for determining real-time lane level snow accumulation. Vehicles driving along a road in snowy conditions capture images of the road using cameras or other vehicles sensors. A vehicle system of a vehicle inputs a captured image into a scene segmentation neural network to obtain an edge map of the road. The vehicle system then inputs the edge map, the captured image, and an HD map of the road, indicating road geometry, into a trained regressor neural network. The regressor neural network then outputs an estimated snow depth for each lane of the road.

Multiple vehicles may determine estimated snow depths for the road and each vehicle may transmit its determined estimated snow depth to an edge server. The edge server may aggregate the snow depths receive from the multiple vehicles to determine an aggregate snow depth for the road. The edge server may transmit the aggregate snow depth for the road to a cloud server.

The cloud server may receive aggregate snow depths from a plurality of edge servers relating to a plurality of roads. The cloud server may use the received aggregate snow depth data to maintain a comprehensive map of lane-level snow depths for a plurality of roads over a geographic region. The cloud server may also receive weather data that predicts future snow accumulation for one or more geographic areas. The cloud server may use the weather data to predict future snow depths for one or more roads in the geographic region. The cloud server may then transmit the future predicted snow depths to the edge servers.

After receiving the future predicted snow depths from the cloud server, an edge server may relay the future predicted snow depths to vehicles within a coverage area of the edge server. A vehicle within the coverage area of an edge server may receive the snow depth data from an edge server and may display the snow depth to a driver of the vehicle. The vehicle system may also determine an optimal lane for the vehicle to use based on the snow depth data received from the edge server and may display the optimal lane to the driver of the vehicle. As such, a driver may be aware of lane-level snow depths as they driver and may be able to make better choices about which lane to driver in and/or which road to use accordingly. In addition, the map of lane-level snow depths maintained by the cloud server may be used to direct resources (e.g., snow removal trucks) to more heavily affected areas.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
   inputting an image of a road into a scene se mentation neural network, the scene segmentation neural network is trained to output an edge map of the road based on the image of the road, the edge map indicates edges of objects and boundaries between different objects in the input image;
   inputting the image, a map of the road comprising a road geometry of the road, and the edge map into a trained regressor neural network;
   determining an estimated snow depth for each of one or more lanes of the road based on an output of the regressor neural network;
   determining an optimal lane of the road for a vehicle to drive in based on the estimated snow depth for the one or more lanes of the road; and
   operating the vehicle autonomously to follow the determined optimal lane.

2. The method of claim 1, wherein the regressor neural network is trained using supervised learning techniques with training data having ground truth labels comprising measurements of snow depths.

3. The method of claim 1, further comprising:
   receiving an aggregate snow depth for the one or more lanes of the road from an edge computing device.

4. The method of claim 3, further comprising:
   determining a difference between the estimated snow depth for the one or more lanes of the road and the aggregate snow depth for the one or more lanes of the road;
   determining whether the difference is greater than a threshold value; and
   upon determination that the difference is greater than the threshold value, transmitting the estimated snow depth to the edge computing device.

5. The method of claim 3, further comprising:
   determining a difference between the estimated snow depth for the one or more lanes of the road and the aggregate snow depth for the one or more lanes of the road;
   determining whether the difference is greater than a threshold value; and
   upon determination that the difference is not greater than the threshold value, withholding transmitting the estimated snow depth to the edge computing device.

6. The method of claim 3, further comprising:
   displaying the aggregate snow depth for the one or more lanes of the road such that a simulated level of the aggregate snow depth for the one or more lanes is visible to one or more occupants of the vehicle.

7. The method of claim 3, further comprising:
   displaying an indication of the optimal lane such that the indication is visible to one or more occupants of the vehicle.

8. The method of claim 1, further comprising:
   determining whether the estimated snow depth for at least one lane of the one or more lanes of the road is above a threshold value; and
   upon determination that the estimated snow depth for at least one lane of the one or more lanes of the road is above the threshold value, broadcasting the estimated snow depth to one or more other vehicles within communication range.

9. A vehicle system for a vehicle comprising:
   one or more processors;
   one or more memory modules;
   one or more vehicle sensors; and
   machine readable instructions stored in the one or more memory modules that, when executed by the one or more processors, cause the vehicle system to:
   input an image of a road into a scene segmentation neural network, the scene segmentation neural network is trained to output an edge map of the road based on the image of the road, the edge map indicates edges of objects and boundaries between different objects in the input image;
   input the image, a map of the road comprising a road geometry of the road, and the edge map into a trained regressor neural network;
   determine an estimated snow depth for each of one or more lanes of the road based on an output of the regressor neural network;
   determine an optimal lane of the road for the vehicle to drive in based on the estimated snow depth for the one or more lanes of the road; and
   operate the vehicle autonomously to follow the determined optimal lane.

10. The vehicle system of claim 9, wherein the machine readable instructions, when executed, further cause the vehicle system to:
    receive an aggregate snow depth for the one or more lanes of the road from an edge computing device;
    determine a difference between the estimated snow depth for the one or more lanes of the road and the aggregate snow depth for the one or more lanes of the road;
    determine whether the difference is greater than a threshold value; and
    upon determination that the difference is greater than the threshold value, transmit the estimated snow depth to the edge computing device.

11. The vehicle system of claim 10, wherein the machine readable instructions, when executed, further cause the vehicle system to:
    display the aggregate snow depth for the one or more lanes of the road such that a simulated level of the aggregate snow depth for the one or more lanes is visible to one or more occupants of the vehicle.

12. The vehicle system of claim 10, wherein the machine readable instructions, when executed, further cause the vehicle system to:
    display an indication of the optimal lane such that the indication is visible to one or more occupants of the vehicle.

\* \* \* \* \*